United States Patent [19]

Reedy

[11] 4,137,937
[45] Feb. 6, 1979

[54] ADAPTER FOR BOTTOM OPERABLE TANK CAR VALVE

[75] Inventor: Charles E. Reedy, Bridgeton, Mo.

[73] Assignee: ACF Industries, Incorporated, New York, N.Y.

[21] Appl. No.: 776,451

[22] Filed: Mar. 10, 1977

[51] Int. Cl.² ............................................. F16K 31/44
[52] U.S. Cl. .................................... 137/321; 251/144; 251/291
[58] Field of Search ................. 137/321, 322; 251/144, 251/291, 149, 148, 268, 293; 285/312; 141/346, 383, 384, 385, 386

[56] References Cited

U.S. PATENT DOCUMENTS

| | | | |
|---|---|---|---|
| 1,278,813 | 9/1918 | Weaver | 251/144 |
| 1,530,651 | 3/1925 | Corbett | 285/312 |
| 2,092,926 | 9/1937 | Lithgow | 251/144 X |
| 2,567,426 | 9/1951 | Ferrari | 251/291 X |
| 3,219,054 | 11/1965 | Elder et al. | 251/291 X |
| 3,473,569 | 10/1969 | Guertin et al. | 141/346 X |
| 3,981,481 | 9/1976 | Reedy et al. | 251/144 |

Primary Examiner—William R. Cline
Attorney, Agent, or Firm—Henry W. Cummings

[57] ABSTRACT

An adapter for use with a bottom operable tank car valve assembly includes an upper attachment portion for quickly attaching the adapter to a bottom operable tank car valve guard assembly. The adapter includes a body portion having one or more spouts extending radially outwardly from the body portion to receive loading and unloading conduits. An adapter operator is provided having a lower tool connection portion and a vertical extension extending upwardly within the adapter for attachment to a valve closure operator located within the valve guard assembly for opening and closing the tank car valve. The present invention also includes a method of transporting lading from place to place utilizing the adapter for loading and unloading the lading and the valve guard assembly while the car is in transit to protect the valve closure from impacts in transit.

5 Claims, 8 Drawing Figures

ADAPTER FOR BOTTOM OPERABLE TANK CAR VALVE

BACKGROUND OF THE INVENTION

In U.S. Pat. No. 3,981,481 granted Sept. 21, 1976, assigned to the same assignee as the present application, a bottom operable tank car valve is disclosed including a valve body attached to an opening in the bottom of the tank. The valve body includes an opening centrally thereof for loading and unloading the lading. A depending housing is attached to the valve body with mechanical fasteners which constitute a shear plane. The housing includes a loading and unloading spout extending radially outwardly from the outlet. An operator assembly for loading and unloading the tank is mounted within a bore in the lower portion of the housing. The operating assembly includes a lower operator which extends below the valve housing and which is adapted to be engaged by a suitable unloading tool. The lower operator has a square opening engaging with clearance a square head on an upper valve operator which extends upwardly within the opening in the valve body. A retainer assembly attached to the valve body maintains the upper operator vertically fixed and spaced from the walls of the valve body. The upper operator engages a depending member from a valve closure. The closure is movable between a closed position engaging the top surface of the retainer assembly, and an open position to load or unload the lading.

The depending valve housing is a heavy and expensive member, usually a casting. If this housing could be eliminated, or made smaller, considerable cost and weight savings in the tank car valve assembly would be obtained. Also, the size and weight of this housing makes disassembly and removal of the housing awkward for the operator.

Usually the spout for unloading on the housing extends radially outwardly from the outlet only in one direction. This requires that the unloading operator move the unloading hose and connection adapter so as to engage the unloading spout in the position that the spout is located when the car arrives at destination. Since the unloading hose is often heavy and often includes little surplus length, this can be a difficult operation, and may require relocation of the tank car.

The present housing requires that the unloading hose be attached with a threaded connection. Threads are provided on the housing for attaching the unloading hose and for attaching a removable cap which is applied over the loading and unloading spout. Some receivers prefer to attach the unloading hose to the internal threads where the unloading plug is attached and where the tube for heating congealed lading is usually attached (element 104, FIG. 1 of the '481 patent). In either case attachment of the unloading hose to a threaded fitting may require the cost of the expensive plummer time in some locations to make this connection. Thus a quick-connect-disconnect connection would be more desirable than the threaded connections presently provided on the housing.

If the housing is impacted in transit, particularly adjacent the valve operator, the valve operating assembly for raising and lowering the valve closure can be damaged, making unloading difficult. Moreover if the impact is severe enough the valve closure may be moved vertically from its seated position, and if the housing shears off along the shear plane provided in the mechanical fastener, lading can escape.

In application Ser. No. 776,450, filed Mar. 10, 1977, the depending valve housing is replaced with a depending valve guard attached to the valve body with mechanical fasteners which constitute a first shear plane. The valve guard includes a depending cylindrical portion. A valve guard cap is attached to the cylindrical portion which has a protrusion which extends outwardly below the bottom of the valve guard. The valve guard cap includes an opening located radially inwardly and preferably above the protrusion for inserting a tool to check that the valve closure is tightly engaged in the closed position, and for unloading the outlet in an emergency. Normally this opening is closed with a valve guard plug. If the valve guard assembly is impacted, little if any impact force is transmitted to the valve closure or the valve closure operator located within the valve body.

The closure operator is located within the valve body at a point above the shear plane defined by the mechanical fasteners holding the valve guard in engagement with the valve body. Thus in the event of impact to the valve guard if the impact is severe enough and has a large horizontal component, the housing will shear off along the shear plane provided in the mechanical fasteners and the valve guard assembly will drop off, leaving the closure operator and valve closure in place within the valve body. After such an impact the car can be unloaded by removing the valve guard plug inserting a suitable fastening tool to the operator to raise the valve closure and unload the car. The valve guard cylindrical portion includes a concave contour for attachment of a bottom operable tank car valve adapter for loading and/or unloading the car.

SUMMARY OF THE INVENTION

In accordance with the present invention a bottom operable tank car valve adapter is provided to be attached to the valve guard at the loading or unloading site for loading or unloading the lading. The adapter includes an upper portion having means for connecting the adapter to the valve guard. The adapter may be attached to either the external surface or the internal surface of the valve guard. In one embodiment a quickly connectable fitting is attached to the adapter for quick attachment to, and removal from, the valve guard. In another embodiment the adapter is attached to the valve guard with a threaded fitting. The adapter includes at least one radially extending spout which can be positioned when the adapter is attached to the valve guard to extend in a radial direction which is convenient for attachment of a hose or conduit for loading and/or unloading the car. In one embodiment the spout includes a quickly removable spout cap, which is held in place with a quick connect-disconnect fitting. In another embodiment a pair of unloading spouts are provided extending in different directions to facilitate attachment of an unloading hose in emergency situations. The adapter further includes a vertical bore having an adapter operator mounted therein which extends vertically in the bore and includes a lower tool connection portion and an upper extension to engage a depending closure operator within the valve body to raise and lower the valve closure for loading and unloading of the lading. The adapter can be made of relatively light material such as aluminum alloy or plastic making attachment to the valve guard easier for loading and unloading personnel. The present invention also includes a method of transporting lading from place to place utilizing the adapter for loading and unloading the lading and the valve guard assembly while the car is in transit to protect the valve closure from impacts in transit.

THE DRAWINGS

FIG. 1 is a sectional view of the bottom operable loading and unloading valve disclosed in U.S. Pat. No. 3,981,481;

DESCRIPTION OF PRIOR ART

Figures 1, 1A, 1B, 1C:
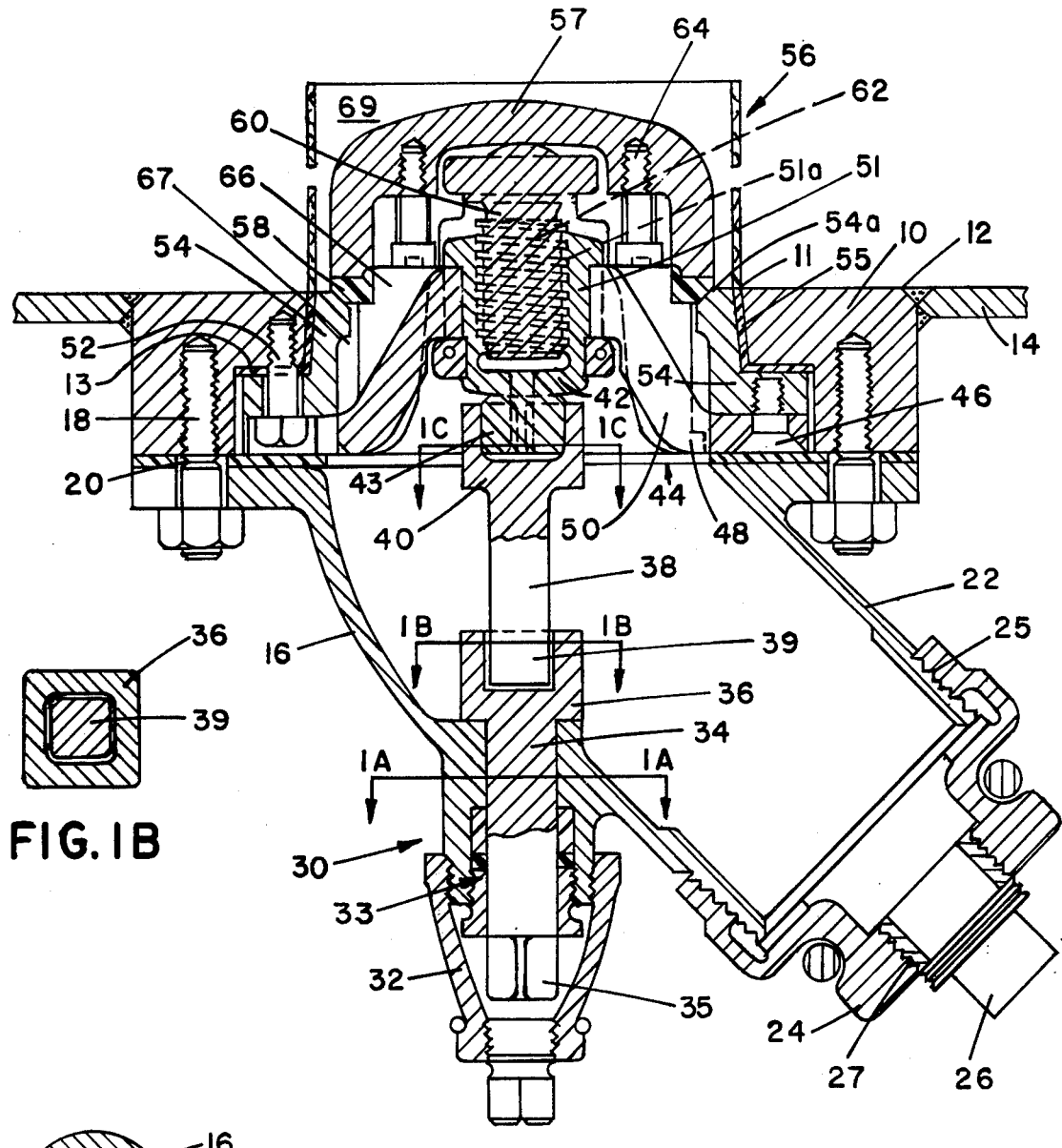
FIG. 1A is a sectional view looking in the direction of the arrows along the line 1A—1A in FIG. 1.
FIG. 1B is a sectional view looking in the direction of the arrows along the line 1B—1B in FIG. 1.
FIG. 1C is a sectional view looking in the direction of the arrows along the line 1C—1C in FIG. 1.

The bottom operable outlet valve assembly illustrated in FIG. 1 of the drawings is described in U.S. Pat. No. 3,981,481 assigned to the same assignee as the present application and reference is made thereto for a detailed description of this prior art valve assembly. It is sufficient for an understanding of the present invention to point out that this outlet valve includes a valve body 10 which is welded within an opening 12 in the bottom of a tank 14. Valve body 10 is provided with an opening 15 centrally thereof. A depending housing 16 is attached to the valve body 10 with mechanical fasteners 18 containing a shear plane 20. The housing includes a loading and unloading spout 22 including a cap 24, which is attached to threaded fittings 25. In transit a plug 26 is inserted into threaded opening 27 in cap 24. At destination this cap is removed to determine if there has been leakage of the lading in transit. A tube for heating congealed lading may also be attached at this point. The lading is usually unloaded through a hose attached to threads 25. However, occasionally plug 26 is removed and a smaller hose is attached to threads 25.

A lower valve operator assembly 30 is mounted within housing 16 including a removable cap 32. A vertically extending first operator 33 includes a circular body portion 34 (FIG. 1A), a lower tool connection portion 35, and an upper connection portion 36 of square cross section which engages a second operator 38 having a smaller square cross section 39 (FIG. 1B). Second operator 38 has an upper portion 40 also of square cross section which engages an upper operator 42 having a depending connection portion 43 of smaller square cross section than portion 40 of operator 38 (FIG. 1C).

A retainer assembly 44 is mounted within opening 15 in valve body 10. Second mechanical fasteners 46 maintains a first retainer portion 48 in place within valve body opening 10 and attached to second retainer portion 54. First retainer portion 48 includes inwardly and upwardly extending radially spaced arms 50 which engage an upper extension 51 of upper operator 42 and maintain upper operator 42 spaced from the walls of the valve body 10. Third mechanical fasteners 52 maintain second retainer portion 54 in engagement with a seal 55 which engages horizontal surface 13 of valve body 10.

A valve closure assembly 56 includes a valve closure 57 having a depending seal 58. Closure 57 is movable vertically between a closed position engaging the upper surface 54a of second retainer portion 54 and an open position allowing loading and unloading of the lading through spout 22.

Valve closure 57 has a depending member 60 which is threaded at 62 and engages a threaded portion 51a of extension 51 of upper valve operator 42. Fasteners 64 hold in place guides 66 depending from closure 56 which holds in place seal 58 and 66a and moves within the space between retainer arms 50. Guides 66 engage catch 67 on second retainer portion 54 to limit vertical movement of closure 57 in the open position. If desired second retainer portion 54 may also hold in place a screen 69 to prevent objects in the tank from contacting valve closure 57.

It will be apparent that when cap 32 is removed and a suitable tool is applied to the connecting portion 35 of operator 34, the operators 34, 38, and 42 will rotate and the threads 51a of operator 42 will engage threads 62 of depending closure member 60 and move closure 57 up or down, depending upon the direction of rotation.

As mentioned above this bottom operable valve is advantageous in that in the event that the housing 16 is impacted the housing will shear off along the shear plane 20 and the lower valve operators 34 and 38 will drop off below upper operator 42. Thus after such impact, upper operator 42, retainer assembly 44 and valve closure assembly 56 will remain in place. The car can be unloaded by a suitable tool engaging the connecting portion 43 of upper operator 42. Furthermore, first retainer portion 48 can be disassembled by removing fasteners 46 with lading in the tank.

However, this assembly is disadvantageous in that if the lower portion of the housing is impacted, a component of this impact is transmitted upwardly through lower valve operator assembly 30 and into upper operator 42 and cooperating threads 51a and 62. As a result of such impacts, these threads thus can bind up and make unloading of the outlet difficult at destination.

Furthermore such impacts, if severe enough, not only may damage threads 51a and 62 but also may cause vertical movement of valve closure 57 and leaking or spilling of the lading. Thus including the lower valve operator assembly 30 which can apply impact loads to upper operator 42 in transit is undesirable.

Furthermore, the valve housing 16 is a large, heavy member, usually a casting. It is necessarily heavy to withstand the rigors of over-the-rail handling of the tank car. If this heavy housing could be eliminated or reduced to light weight, a significant weight reduction in the car would result.

Also, unloading spout 22 extends in only one direction at destination. Thus the unloading operator must connect onto this spout 22 with a heavy hose having a threaded fitting to attach to threads 25. Occasionally the hose is short making this connection particularly difficult. Some receivers desire to remove plug 26 and attach a smaller diameter threaded fitting to threads 25. However, in either case, connection of the unloading hose involves the attachment of a threaded fitting, which at some locations involves the use of plumber's labor rates at the unloading site, which is expensive.

In accordance with the teachings of application Ser. No. 776,450, filed Mar. 10, 1977, the valve housing 16 is shown in FIG. 1 is eliminated and is replaced with a valve guard assembly 70 shown in FIG. 2. Reference may be made to this application for a detailed description of the valve guard assembly 70. It is sufficient for an understanding of this invention to point out that valve guard assembly 70 includes a valve guard 72 having a flange portion 73 including openings therein 74 through which fasteners 76 pass to hold the valve guard in engagement with valve body 78. Fasteners 76 include a shear groove 77. Valve body 78 may be welded to the tank as shown in FIG. 1 at 12 or may be attached with fasteners 80 circumferentially spaced from fasteners 76 (FIG. 3) to a universal flange 82 which is welded to tank 14. In the arrangement shown in FIG. 2 closure assembly 56a including valve closure 57a seats on the upper end 84 of valve body 78. Retainer 86 includes radial arms 87 held in place with slots 88 in the valve body and projections 90 on the inner end of retainer 86. Retainer 86 engages upper portion 42b of upper operator 42a and split collar 93 to hold upper operator 42a in place. Valve closure depending member 66b held in place with fasteners 64a maintains seal retainer 58a and elastomeric seal 59a in place at 66c. If elastomeric seal should soften due to high temperature in the tank, the lading weight will force closure 57a and retainer 58a into sealing engagement with valve seat 84. Clearance for this downward movement is provided at 58b. Depending member 66a moves between retainer radial arms 87 as in FIG. 1 as the valve closure is moved between open and closed position. The valve closure is raised and lowered by upper operator 42a in the same way as described in regard to FIG. 1. Threads 51b engage threads 62a on depending operator 60a as upper operator 42a is rotated.

Valve guard 72 further includes a depending portion 92 having a concave contour 96 which is adapted to be engaged by the loading or unloading adapter of the present invention.

Depending portion 92 is internally threaded at 98 and is adapted to receive a valve guard cap 100. Cap 100 includes cooperatig threads 102, ad has mounted thereon a sealing gasket 103. Cap 100 further includes a lower circumferential protrusion 104 which is slotted at 106. A transverse portion 107 of cap 100 extends below, but vertically spaced from upper operator connection portion 43. A chain 108 may be provided to maintain valve guard cap 100 from getting lost or misplaced when it is removed; chain 108 may be attached to a suitable point (not shown) on the outlet.

A valve guard plug 110 having threads 112 is adapted to be removably inserted within cap opening 114 having plug threads 115. Plug 110 includes a square connection portion 117. Plug 110 has a chain 118 attached thereto for safe keeping. For U.S. operation, valve guard 72 and valve guard cap 110 are sized to extend below the tank car a distance not exceeding six (6) inches as required by the Association of American Railroads.

In operation, if the guard assembly 70 is impacted, this will generally occur at some point on circumferential protrusion 104. Thus the impact forces will be transmitted upwardly from protrusion 104 through valve guard depending portion 96. Gasket 103 tends to prevent impacts damaging cooperating plug threads 112 and 115. The vertical component of the impact force applied to the valve guard is applied to the valve body 78 and universal flange 82 which are relatively massive and can withstand such vertical impacts, and then into the massive tank 14. Impact forces with large horizontal components will cause the valve guard assembly 70 to shear off along the shear plane 77 in mechanical fasteners 76.

Note that connection portion 43a of valve operator 42a is vertically spaced from cap transverse portion 107, and is spaced inwardly from the walls of valve body 78. Thus with this arrangement little, if any, impact force is transmitted to the valve operator 42a. Thus it is much less likely that the upper operating assembly or valve closure 57a will be damaged due to impact than with the valve housing 16 of U.S. Pat. No. 3,981,481 with its lower operating assembly in position to transmit impact forces vertically into the operator and/or valve closure.

Valve guard plug 110 may be removed and a tool of smaller cross section than the valve cap opening 114 may be inserted which engages the valve operator connection portion 43a to check for leakage or to determine if the valve closure 57a has been tightened into closed position. A lading receptacle 119 may be used to collect lading which may have leaked in transit. If there has been little or no leakage, plug 110 may be removed and cap 100 removed by passing a bar through slots 106 for rotation. A tool engaging operator 43a can be used to unload the lading in an emergency, without taking the time to remove cap 100 if time is critical. Opening 114 is sized to provide clearance between the walls of the opening and a tool passing through the opening so that the ladig can be unloadd through opening 114.

Furthermore if impact is to occur, it is most likely that impact will occur on depending protrusion 104 rather than on plug 110 because protrusion 104 extends below and protects plug 110 from such impacts. Thus it is unlikely that plug 110 or cooperating threads 112 and 115 would be damaged by impact. Thus in an emergency situation it is very unlikely that difficulty would occur in removing plug 110 to unload the lading through opening 114 in an occasion when unloading the lading quickly was essential.

The adapter of the present invention is attached to the valve guard assembly at the loading and unloading site for loading and/or unloading the lading.

Figure 3:
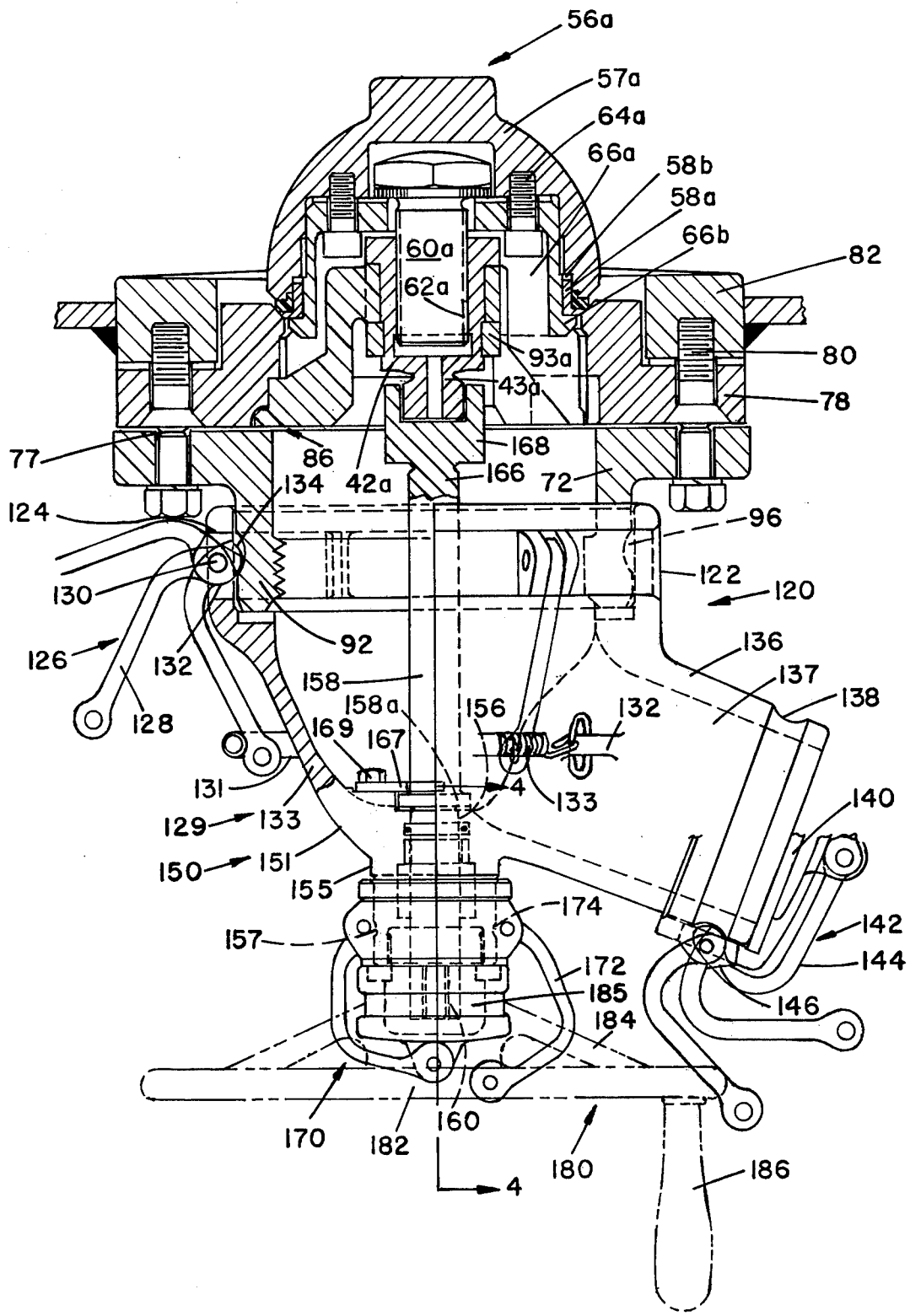
FIG. 3 is a sectional view of one embodiment of a loading and unloading adapter which may be used with the valve guard of the present invention partly in section, and illustrating an operating tool for the adapter in phantom.

Referring now to FIG. 3, an adapter 120 includes a quick connect-disconnect portion 122 adapted to engage the depending portion 92 of the valve guard 72. Adapter quick connect-disconnect portion 122 is preferably cylindrical and is provided with circumferentially spaced slots 124 having mounted therein quick connect-disconnect locking devices 126. Locking devices 126 may include an arm 128 mounted about a pin 130 attached to quick connect-disconnect portion 122. Arm 128 includes a locking portion 132 having an overcenter contour 134 adapted to engage concave contour 96 of valve guard depending portion 92. Preferably a plurality of such locking devices 126 are provided about the periphery of cylindrical portion 122.

Arms 128 are maintained in the closed position by means of a spring arrangement 129 including a circumferential tube 131 having a spring attached thereto 131 which is attached to the adapter body portion 132 at any convenient point. To remove arms 128 from the position shown in FIG. 3 the operator moves the tube 131 relative to the arm 128 to free the arms for movement out of the overcenter position.

Adapter 120 also includes a loading and unloading spout 136. Spout 136 is preferably cylindrical and extends radially outwardly and downwardly from quick connect-disconnect portion 122. Spout 136 includes discharge opening 137 and a concave contour 138 near the end thereof which is adapted to receive a removable cap 140. Cap 140 preferably includes a quick connect-disconnect device 142 similar to locking device 126 including arms 144 and an overcenter contour 146 which engages concave contour 138 of spout 136. It will be noted that when adapter 120 is attached to valve guard 72, that spout 136 may be so placed as to be convenient for the operator to attach a loading or unloading hose. The unloading hose may be attached with a quick connect lock on the hose coupling (not shown) to concave contour 138, and thus avoid the use of a threaded fitting and the necessity of having a plummer make this connection at some loading and unloading sites.

Figure 4:
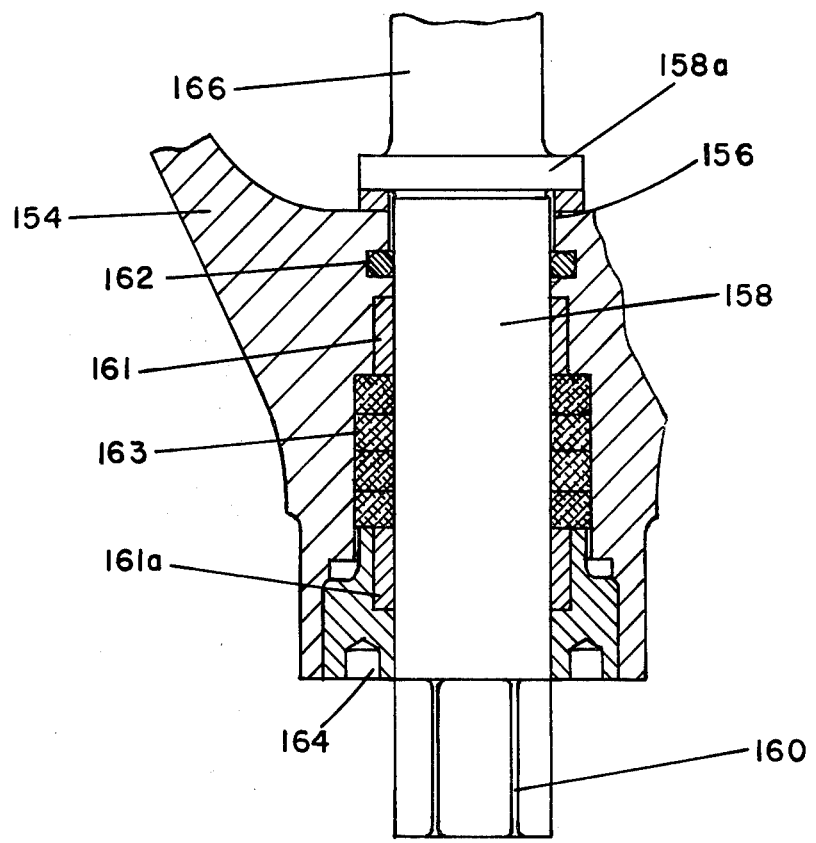
FIG. 4 is a sectional view looking in the direction of the arrows along the line 4—4 in FIG. 3, with the cap of the operator removed.

Adapter 120 also includes a valve operator assembly 150. The adapter body 132 includes a generally cylindrical tapered portion 133 which is tapered inwardly except in the area where spout 136 extends outwardly. Tapered portion 133 terminates in an adapter operator body portion 154. As shown best in FIG. 4, a bore 156 is provided in body portion 154. A valve operator 158 is provided in bore 156. Operator 158 includes a tool connection portion 160 having a square cross section adapted to receive a suitable tool for loading and unloading the outlet.

A pair of operator insert guides 161 and 161a, an o-ring seal 162 and a packing 163 are provided in bore 156 engaging operator 158. An adjusting screw 164 is provided to maintain packing 163, and guides 161 and 161a in place. Operator 158 also includes an upper extension portion 166 which may be circular in cross section. However, extension portion 166 includes an operator engagement portion 168 (FIG. 4) of square cross section of suitable size to engage the square cross section of connecting portion 43 of operator 42. A retainer 167 engaging a shoulder 158a on operator 158 held in place with a fastener 169, holds operator 158 against vertical movement.

A removable cap 170 is provided to cover valve operator portion 150. Cap 170 engages a depending pposition engaging a concave contour 157 of adapter depending portion 155.

When the cap 170 is removed a suitable operating tool 180 is attached for rotation of operator 158 and operator 42 for opening and closing the valve closure 57. Tool 180 includes a circumferential body portion 182 having arms or ribs 184 which extend inwardly and upwardly to define an engagement portion 185 having a square cross section which engages the square cross section of operator tool connection portion 160. A suitable handle 186 is provided for manual rotation. If desired automatic rotative power may be connected to tool 180 to load or unload the lading.

Figure 2:
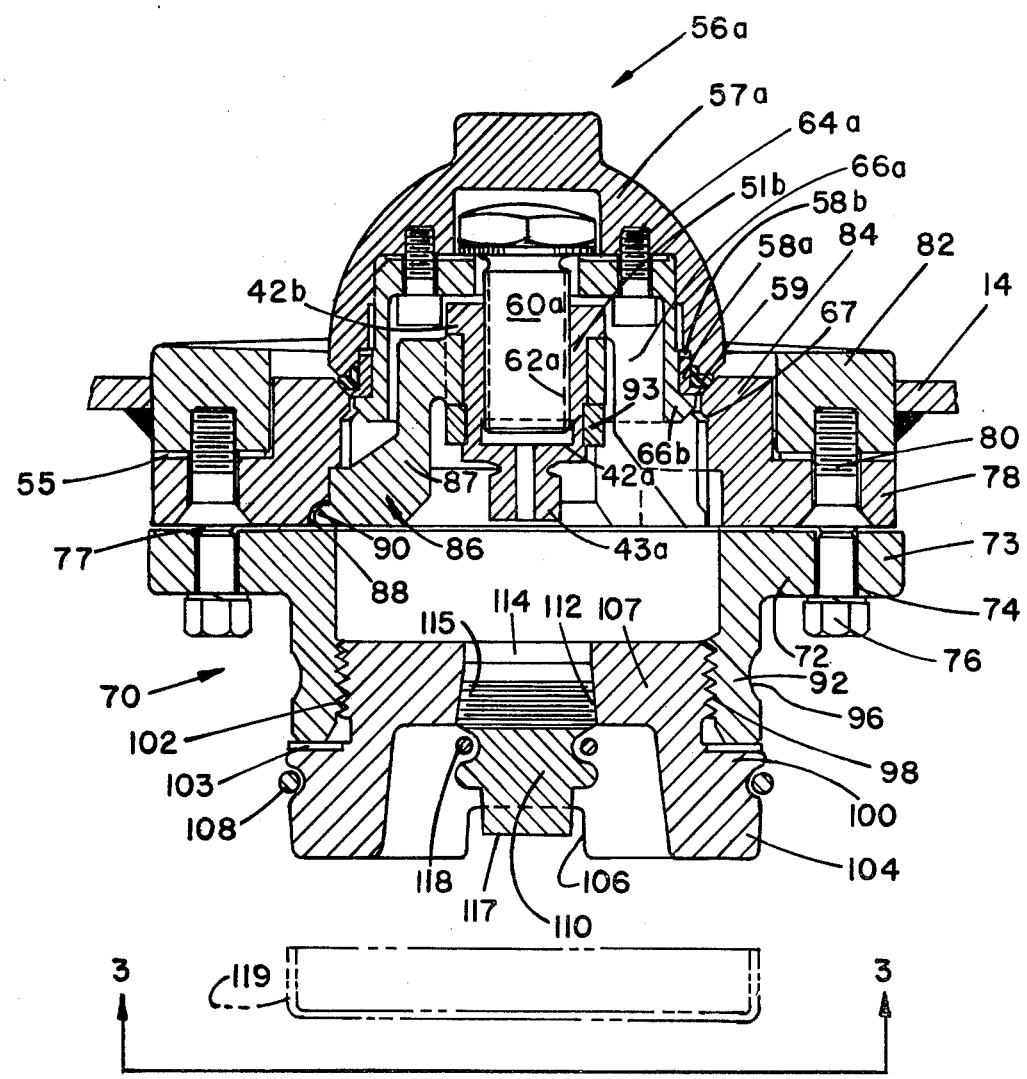
FIG. 2 is a sectional view looking in the direction of the arrows along the line 2—2 in FIG. 3 of a bottom operable outlet valve assembly of the present invention illustrating the valve guard and guard cap.

In operation of the valve guard assembly of the present invention it will be assumed that the tank car arrives at the unloading site with lading to be unloaded. The car arrives with the valve guard assembly 70 in place as illustrated in FIG. 2, with cap 100 fastened in place within opening 98 and plug 110 in place within opening 114. To unload the lading plug 110 is first unloosened by attaching a tool to portion 117, to determine if lading has leaked in transit. It is unusual for significant leakage to occur, but if this is the case, receptacle 119 is obtained to collect the lading as plug is completely removed. If little, or no leakage has occurred plug 110 is removed and cap 100 is removed by appropriate rotation of bar through slots 116 to disconnect cap threads 112 from valve guard threads 115.

Adapter 120 is then inserted over valve guard depending portion 92 in a direction convenient to attach an unloading hose to spout 136 and locking member 126 are moved into the overcenter position shown in FIG. 3. Arms 128 are placed within resilient tube 131. Cap 140 is then removed from spout 136 by moving arms 144 out of the overcenter position, and an unloading hose with a guide connect fitting attached to concave contour 138. Cap 170 is then removed and a suitable unloading tool 180 is attached to tool connection portion 160. Rotation of tool 180 will then rotate upper operator 42a, raise valve closure 57a and unload the lading through spout 136 and the unloading hose.

Vacuum, pressure, or gravity unloading may be utilized. After the tank has been unloaded it may be desirable to apply a suitable cleaning fluid. This may be done by replacing the unloading hose with a conduit to apply cleaning fluid into the tank. The cleaning conduit is then attached to concave contour 138.

To load the tank, a lading loading conduit is attached to concave portion 138. If not already in the open position, valve closure 57a is moved to the open position by means of a tool 180. The car is then filled with lading by means of a suitable pressure system or vacuum suction system (not shown). After the tank has been filled, tool 180 is used to rotate operators 138 and 42a to move the valve closure 57a into the closed position shown in solid lines in FIG. 3. Tool 180 is then removed from portion 160 and cap 170 is put in place. The loading conduit is disconnected from concave portion 138 and cap 140 is applied in place over concave portion 138, and arms 144 are moved into the overcenter locked position. Then arms 138 are removed from tubular resilient member 131 and are moved out of the overcenter position. Adapter 120 may then be lowered out of engagement with valve guard depending portion 92. Valve guard cap 100 is then threadably inserted within depending portion 92 and valve plug 110 put in place within opening 114. The car is then ready for transport to the next destination.

Since the adapter 120 does not have to withstand the abuse of in-transit travel, it can be made of lighter material such thinner gauge steel, aluminum alloys or strong plastic and made smaller. It is easier for the operation to handle, in contrast to a heavy steel casting. Furthermore, the receiver need only have a relatively few adapters 120 to attach to the number of tanks to be simultaneously unloaded. Each tank car does not have to have a housing as is the case in U.S. Pat. No. 3,981,481. A more economical and lighter bottom operable tank car valve assembly is acheived with the valve guard assembly of the present invention.

Figure 5:
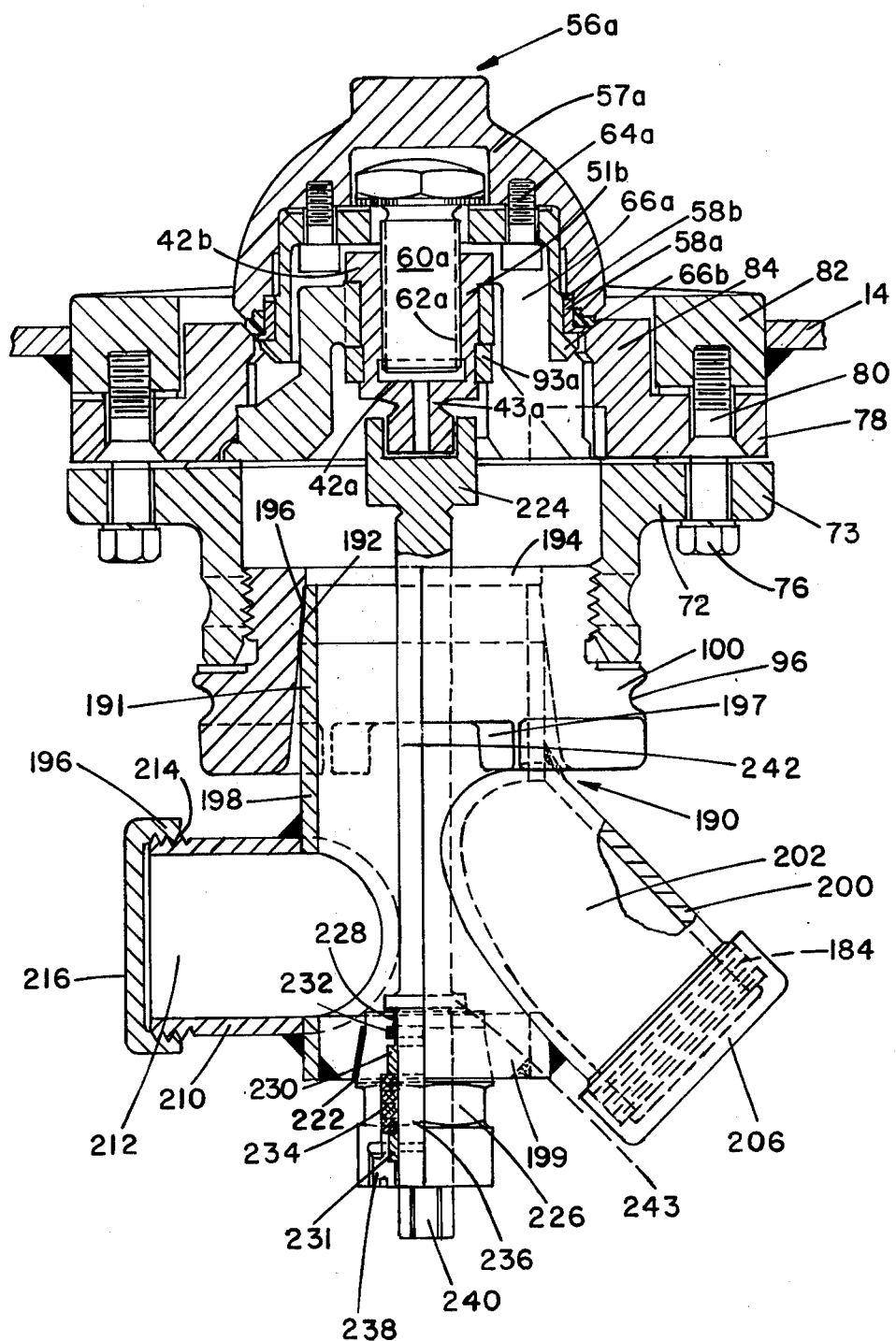
FIG. 5 is a sectional view of another embodiment of a loading and unloading adapter according to the present invention partly in section.

Another embodiment of the bottom operable tank car valve adapter of the present invention is shown in FIG. 5. In this embodiment the adapter indicated generally at 190 is also made of light weight metal and includes an attachment portion 191 which is threaded as indicated at 192 and is adapted to be inserted within an opening 194 within valve guard cap 72. It will be noted, opening 194 in cap 100 is considerably larger than cap opening 114 shown in FIG. 2. Cap opening 194 includes threads 196 into which a threaded cap 197 (shown dotted in FIG. 5) is attached to close opening 194 for movement of the tank in transit. When the cap 197 is removed adapter 190 is inserted and threads 196 cooperate with threads 192 to maintain adapter 190 in place for loading or unloading the tank.

Adapter 190 includes a hollow cylindrical body portion 198 having a bottom closure 199. Adapter 190 further includes a spout 200 which is directed radially outwardly and downwardly from cylindrical body portion 198. Spout 200 includes an opening 202 which communicates with opening 194. Spout 200 also includes threads 204 adapter to receive a suitable cap 206.

Adapter 190 also includes a second spout 210 which is radially directed in a horizontal direction, generally perpendicular to cylnder body portion 198. Spout 210 includes an opening 212 which communicates with opening 194 in the valve body. Spout 210 may be threaded as shown at 214 to receive a suitable cap 216.

If desired caps 206 and 216 may be attached with a quick connect-disconnect coupling similar to connection 142 shown in FIG. 3.

Adapter 190 also includes an operator assembly 220. Closure 199 has a threaded bore 202 into which operator assembly 220 is inserted. Assembly 220 includes a body portion 226 having a bore 228.

A pair of operator insert guides 230 and 231, an o-ring seal 232 and a packing 224 are provided in bore 228 engaging a vertically extending operator 236. An adjusting screw 238 is provided to maintain packing 234 in place. Operator 236 also includes a lower extension 240 for attachment of a suitable tool for loading and unloading the outlet, and an upwardly directed extension 242 of circular cross section. However, extension 242 includes an operator engagement portion 244 of square cross section of suitable size to engage square the cross section 43a of operator 42a when the adapter is attached to cap 100. Lower extension 240 may be provided with a removable cap (not shown) similar to cap 170 in FIG. 3 to cover valve extension 240 when the extension is not in use. Extension 242 includes a flange 243 to maintain the operator in place within body portion 226.

Adapter 190 includes the differently directed spouts 200 and 210 for use in an emergency situation. In the event that the tank is derailed, it is likely that one of the spouts 200 or 210 will be located in a direction such that an unloading hose or conduit can be attached and the tank can be unloaded. To unload the cap 197 is removed and the adapter 190 is attached in its place. As the adapter is moved into opening 194 the operator 244 is made to engage depending portion 43a of operator 42a. The cap 206 or 216 from the spout which is to be used for unloading is removed and an unloading hose or conduit is attached. A tool is attached to connection 240 to rotate extension 242 and operator 43a, to raise valve plug 57a and unload the lading.

Some receivers may wish to utilize such a dual spout adapter to load and/or unload the lading on a regular basis and at the same time have it available for emergency use. The diameter of spouts 200 and 210 may vary as desired.

Instead of cooperating threads 192 and 196 a quick connect internal connection may be provided (not shown) on a dual spout adapter 190 which attaches to the internal surface of cap 100.

It is also within the preview of the present invention to utilize adapter 120 in an emergency situation. Adapter 120 can be utilized in an emergency by removing cap 100 and attaching quick connect arms 128 to concave contour 96 and removing cap 140 by means of quick connect arms 144. Furthermore, if desired a plurality of spouts may be provided on adapter 120 extending in different radial directions and having different vertical inclinations. Thus the adapter of the present invention provides flexibility to meet the needs of the receiver, both in normal loading and unloading, and in meeting emergency unloading situations.

What is claimed is:

1. An adapter for use with a bottom operable tank car valve assembly comprising: a hollow body portion defining a main body opening; at least one spout extending radially outwardly from said body portion; said spout being hollow and having a spout opening in communication with said main body opening; said body portion including an upper adapter attachment portion having adapter attachment means including a quick connect-disconnect fitting including a plurality of arms, each having an overcenter cam surface for removably attaching the adapter to a bottom operable tank car valve assembly; resilient means for maintaining said arms in said overcenter position; closure means located in the lower portion of the adapter closing said main body opening; said closure means having mounted therein an adapter operator assembly including an operator having a lower connection portion adapted to be engaged by a suitable loading and unloading tool, and a vertical extension extending upwardly within said main body opening, said extension having means at the upper portion thereof for attachment to a tank car valve operator located within said tank car valve operator assembly for opening and closing the tank car valve; said spout including a spout groove at its outer end portion and a removable adapter cap having a quick connect-disconnect fitting including at least one cap arm having an overcenter cam surface adapted to engage said groove to hold said cap in place; said quick connect-disconnect adapter attachment means enabling said adapter to be quickly attached to a tank car valve assembly at an unloading site to quickly load and unload lading; and whereby said adapter and said quick connect-disconnect cap fitting enables quick removal of said cap and quick attachment and removal of an unloading conduit.

2. An adapter according to claim 1 wherein said adapter is made of light weight material.

3. An adapter according to claim 2 wherein said light weight material is selected from aluminum alloys.

4. An adapter according to claim 2 wherein said light material is steel.

5. An adapter according to claim 2 wherein said light material is plastic.

* * * * *

UNITED STATES PATENT AND TRADEMARK OFFICE
CERTIFICATE OF CORRECTION

PATENT NO. : 4,137,937
DATED : February 6, 1979
INVENTOR(S) : Charles E. Reedy

It is certified that error appears in the above-identified patent and that said Letters Patent are hereby corrected as shown below:

Col. 1, line 58, "plummer" should read --plumber--.
Col. 4, line 1, "tains" should read --tain--.
Col. 5, line 7, "is" should be deleted.
       line 48, "ad" should read --and--.
Col. 6, line 35, "ladig" should read --lading--; "unloadd" should read --unloaded--.
Col. 7, line 19, "plummer" should read --plumber--.
Col. 7, between lines 47 and 48, insert --portion 155 of adapter body portion 154. Cap 170 includes arms 172 having cam locking contours 174 which are movable to an overcenter--
       line 48, "pposition" should read --position--.
Col. 8, line 3, after "plug" insert --110--.
       line 4, delete the comma after "little".
       line 50, after "such" insert --as--
       line 51, "operation" should read --operator--.
Col. 9, line 14, "adapter" should read -- adapted --.
       line 17, "cylnder" should read --cylinder--.

Signed and Sealed this

Twenty-sixth Day of June 1979

[SEAL]

Attest:

RUTH C. MASON
Attesting Officer

DONALD W. BANNER
Commissioner of Patents and Trademarks